(12) United States Patent
Zeng et al.

(10) Patent No.: US 8,706,417 B2
(45) Date of Patent: Apr. 22, 2014

(54) ANCHOR LANE SELECTION METHOD USING NAVIGATION INPUT IN ROAD CHANGE SCENARIOS

(75) Inventors: Shuqing Zeng, Sterling Heights, MI (US); Bakhtiar Brian Litkouhi, Washington, MI (US); Xingping Chen, Warren, MI (US); James N. Nickolaou, Clarkston, MI (US); Daniel Gandhi, Auburndale, MA (US); Joel Pazhayampallil, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/561,755

(22) Filed: Jul. 30, 2012

(65) Prior Publication Data

US 2014/0032108 A1  Jan. 30, 2014

(51) Int. Cl.
*G05D 1/00* (2006.01)
*G08G 1/137* (2006.01)

(52) U.S. Cl.
USPC ................................ 701/533; 701/24; 701/25

(58) Field of Classification Search
USPC ............... 701/23, 25–28, 468, 523, 533–536; 348/113; 340/995.16–995.19, 995.22
See application file for complete search history.

(56) References Cited

U.S. PATENT DOCUMENTS

| | | | |
|---|---|---|---|
| 6,675,094 B2 * | 1/2004 | Russell et al. | 701/301 |
| 6,748,302 B2 * | 6/2004 | Kawazoe | 701/1 |
| 8,199,976 B2 * | 6/2012 | Muramatsu et al. | 382/104 |
| 2007/0118286 A1 * | 5/2007 | Wang et al. | 701/213 |
| 2010/0191461 A1 * | 7/2010 | Zeng | 701/208 |
| 2011/0054716 A1 * | 3/2011 | Stahlin et al. | 701/1 |
| 2011/0126206 A1 * | 5/2011 | Kato et al. | 718/103 |
| 2012/0303222 A1 * | 11/2012 | Cooprider et al. | 701/48 |
| 2013/0184926 A1 * | 7/2013 | Spero et al. | 701/26 |

OTHER PUBLICATIONS

Moshchuk, Nikolai K., U.S. Appl. No. 13/289,517, filed Nov. 4, 2011 entitled "Lane Tracking System".

* cited by examiner

*Primary Examiner* — Mary Cheung
*Assistant Examiner* — Rodney Butler
(74) *Attorney, Agent, or Firm* — John A. Miller; Miller IP Group, PLC

(57) ABSTRACT

A method for selecting an anchor lane for tracking in a vehicle lane tracking system. Digital map data and leading vehicle trajectory data are used to predict lane information ahead of a vehicle. Left and right lane boundary markers are also detected, where available, using a vision system. The lane marker data from the vision system is combined with the lane information from the digital map data and the leading vehicle trajectory data in a lane curvature fusion calculation. The left and right lane marker data from the vision system are also evaluated for conditions such as parallelism and sudden jumps in offsets, while considering the presence of entrance or exit lanes as indicated by the map data. An anchor lane for tracking is selected based on the evaluation of the vision system data, using either the fused curvature calculation or the digital map and leading vehicle trajectory data.

20 Claims, 4 Drawing Sheets

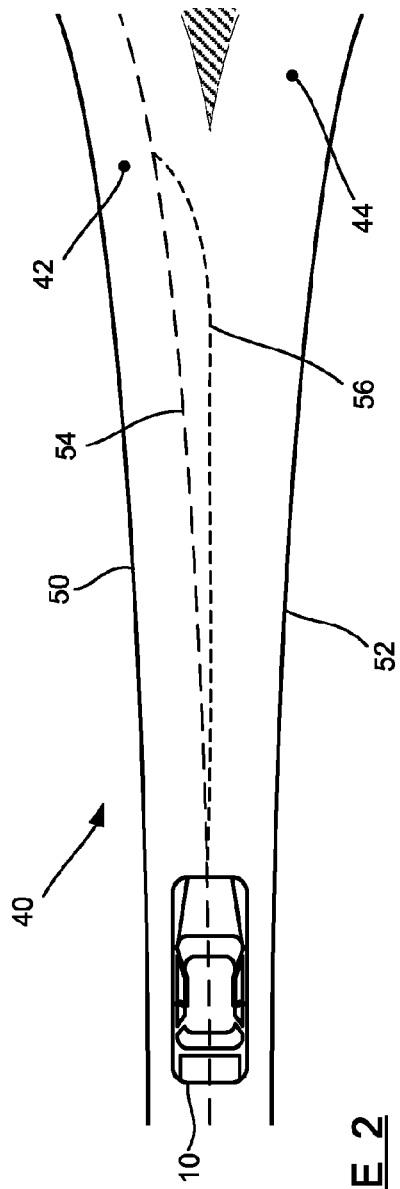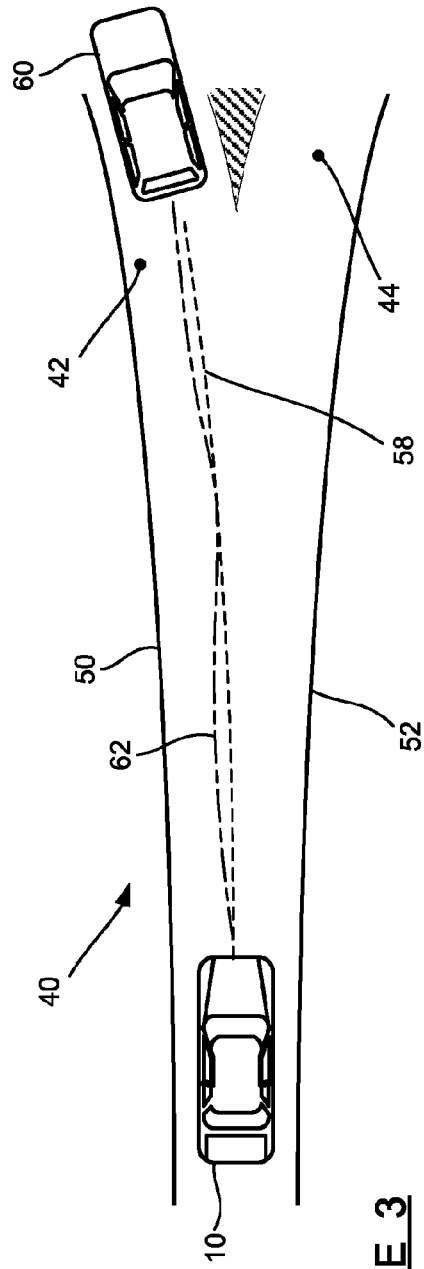
FIGURE 2
FIGURE 3

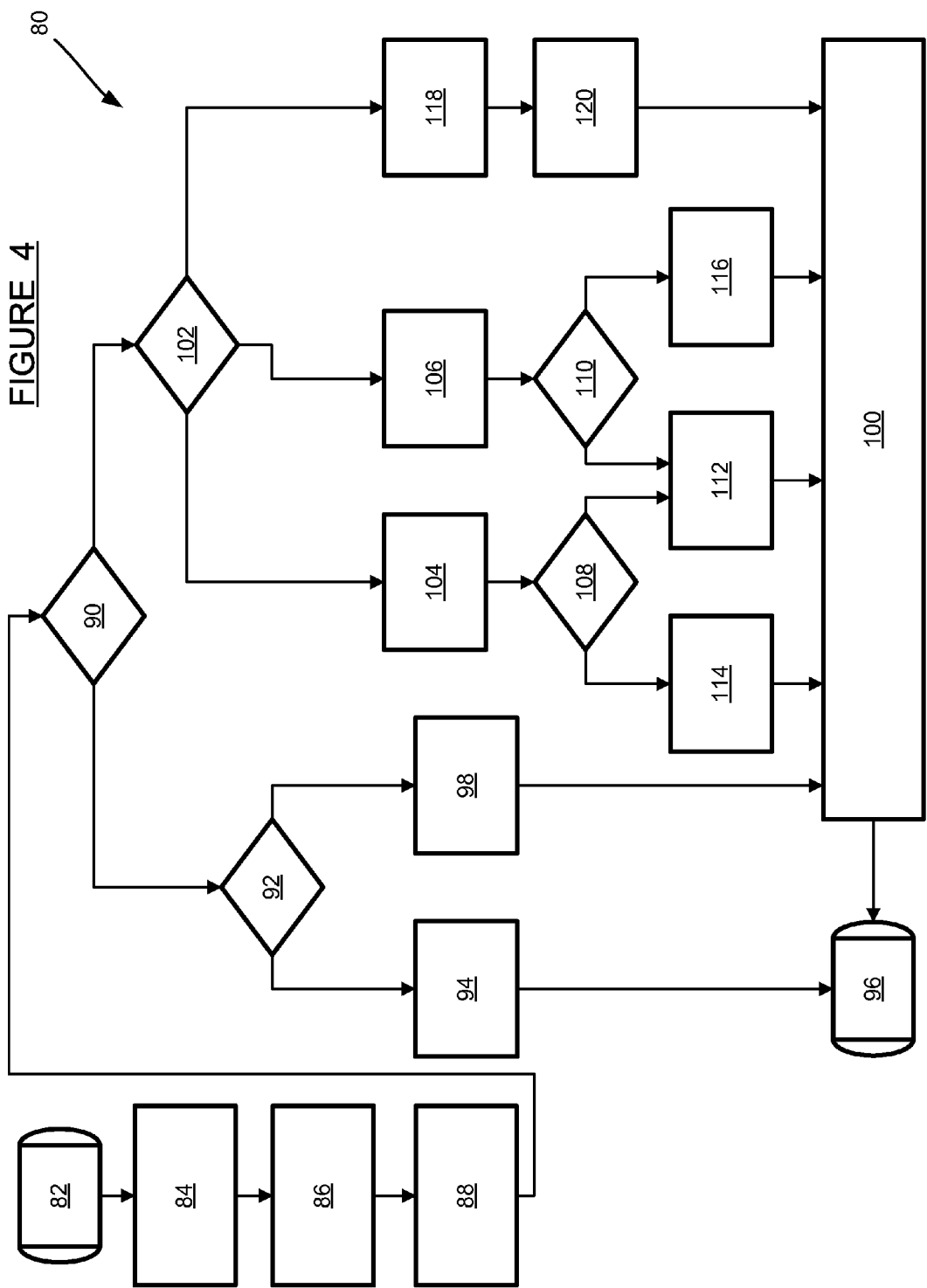

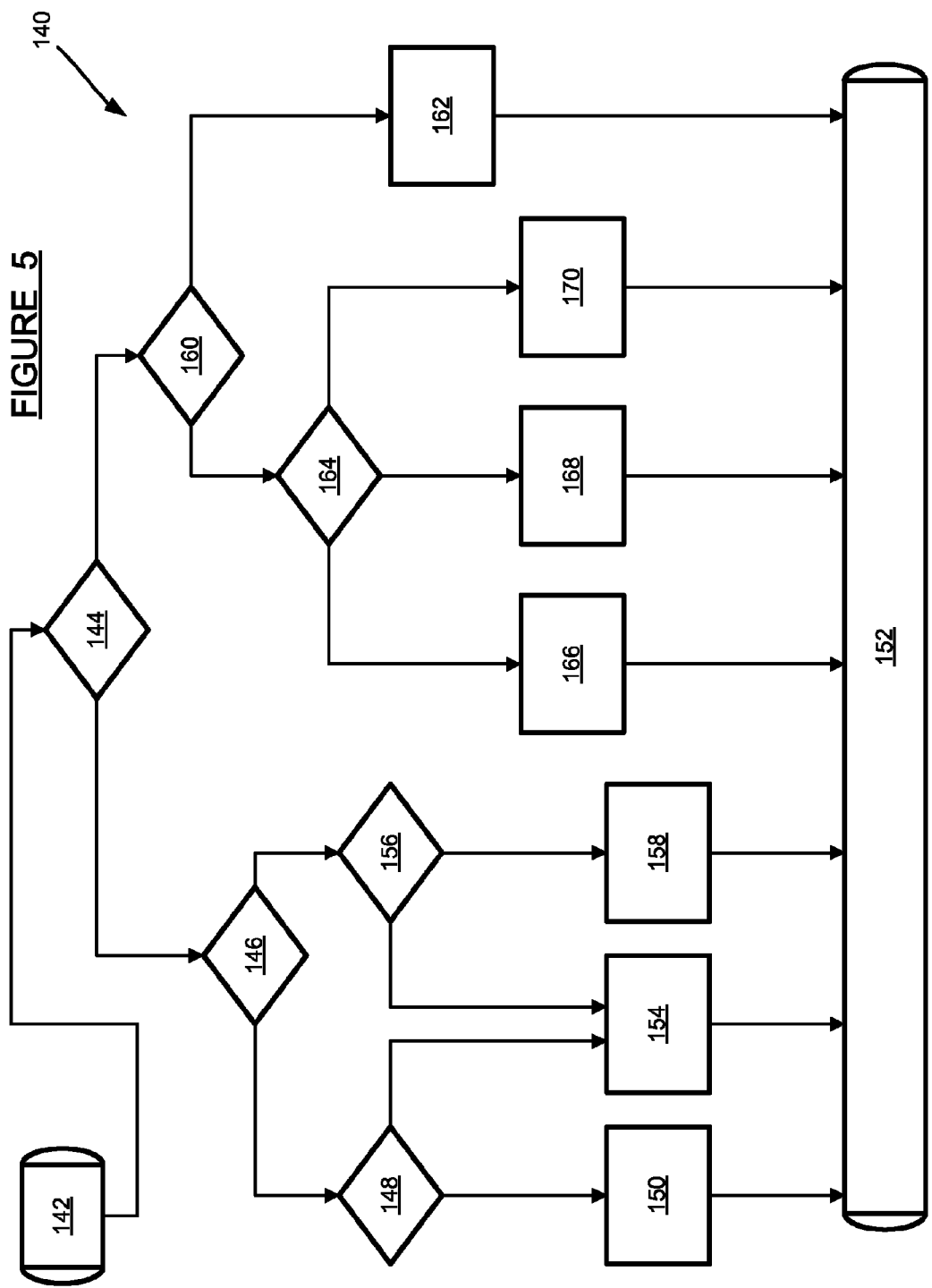

ANCHOR LANE SELECTION METHOD USING NAVIGATION INPUT IN ROAD CHANGE SCENARIOS

BACKGROUND OF THE INVENTION

1. Field of the Invention

This invention relates generally to enhanced lane tracking capability of an automobile and, more particularly, to a method for selecting an anchor lane using navigation and digital map information, leading vehicle trajectories, and other data, to improve lane tracking performance at lane merge and split locations.

2. Discussion of the Related Art

Vehicle lane tracking systems usually employ cameras and image processing technology for identifying lane boundary lines marked on a road. Lane tracking systems may also use other technologies, such as data from magnetic lane boundary markers embedded in specially-prepared roads. Regardless of the type of data used to detect lane boundaries, typical lane tracking systems are designed to position a vehicle in the center of a lane which is assumed to have parallel left and right boundaries.

In situations where the left and right boundaries of a lane are not parallel—such as where an entrance ramp merges with a through lane, or where an exit lane splits from a through lane—typical lane tracking systems may not exhibit the desired behavior. For example, where an exit lane splits from a through lane, and the distance between the left and right lane boundaries is increasing, a typical lane tracking system may keep the vehicle centered between the diverging left and right boundary for a period of time. The system will ultimately have to select either the through lane or the exit lane for tracking, and this selection will cause a sudden, unwanted lateral maneuver of the vehicle. Furthermore, typical lane tracking systems may have difficulty dealing with the ambiguity caused by missing or obscured lane markers.

A lane tracking system is needed which uses all available data to select an anchor lane and exhibits improved lane tracking performance in lane merge and exit scenarios.

SUMMARY OF THE INVENTION

In accordance with the teachings of the present invention, a method is disclosed for selecting an anchor lane for tracking in a vehicle lane tracking system. Digital map data and leading vehicle trajectory data are used to predict lane information ahead of a vehicle. Left and right lane boundary markers are also detected, where available, using a vision system. The lane marker data from the vision system is combined with the lane information from the digital map data and the leading vehicle trajectory data in a lane curvature fusion calculation. The left and right lane marker data from the vision system are also evaluated for conditions such as parallelism and sudden jumps in offsets, while considering the presence of entrance or exit lanes as indicated by the map data. An anchor lane for tracking is selected based on the evaluation of the vision system data, using either the fused curvature calculation or the digital map and leading vehicle trajectory data, as appropriate.

Additional features of the present invention will become apparent from the following description and appended claims, taken in conjunction with the accompanying drawings.

BRIEF DESCRIPTION OF THE DRAWINGS

FIG. 2 is an illustration of a vehicle with a traditional lane tracking system making an unwanted lateral maneuver when presented with a lane tracking dilemma at an exit lane split;

FIG. 3 is an illustration of a vehicle with an enhanced lane tracking system making a proper anchor lane selection when presented with a lane tracking dilemma at an exit lane split;

FIG. 4 is a flowchart diagram of a method for anchor lane selection using multiple sources of data; and FIG. 5 is a flowchart diagram of a method for anchor lane selection using multiple sources of data, when both left and right lane boundary marker data is available.

DETAILED DESCRIPTION OF THE EMBODIMENTS

Figure 1:
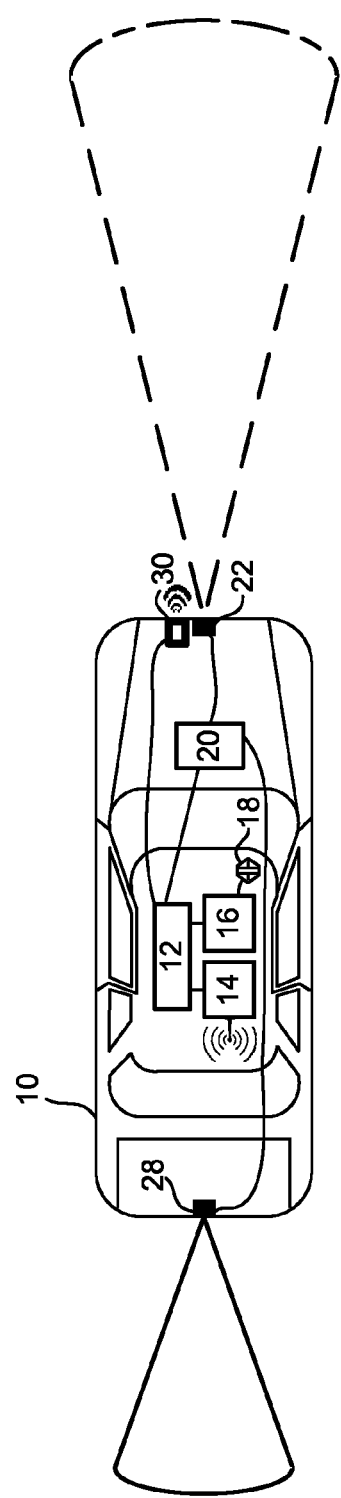
FIG. 1 is a schematic diagram of a vehicle including a lane tracking system.

The following discussion of the embodiments of the invention directed to a method for anchor lane selection using navigation input in road change scenarios is merely exemplary in nature, and is in no way intended to limit the invention or its applications or uses.

Lane tracking systems are increasingly popular on modern vehicles, as semi-autonomous driving becomes a desirable and achievable goal. Typical lane tracking systems use a vision system to detect left and right lane boundary markers, and attempt to maintain the position of the host vehicle midway between the left and right lane markers. However, situations where the left and right lane markers are not parallel, such as at an entrance lane merge or an exit lane split, can cause unwanted behavior in typical lane tracking systems. Other situations, such as missing or obscured lane markers, may also cause problems for traditional lane tracking systems.

FIG. 1 is a schematic diagram of a vehicle 10 including an enhanced lane tracking system 12 which uses data from multiple sources in order to select an anchor lane for tracking. The lane tracking system 12 receives data from a navigation & digital map system 14, a vehicle dynamics system 16 and a vision system 20, and uses all available data in a fusion calculation to select an anchor lane for tracking. The navigation & digital map system 14 includes a digital map database containing data on road routes, roadway types, intersections, merges and exits, etc., as would be understood by a person skilled in the art. The navigation & digital map system 14 uses Global Positioning System (GPS), Dedicated Short Range Communications (DSRC), or other communications systems to keep track of where the vehicle 10 is located, and on what road it is travelling, at all times. The navigation & digital map system 14 also includes point-to-point navigation capability, where a user can enter a desired destination point and the system 14 will provide turn-by-turn navigation instructions to reach the destination.

It is to be understood that the features of the navigation & digital map system 14 may be combined into a single system as described above, or may be embodied in two separate systems—where the digital map database is separate from the navigation feature. Furthermore, the lane tracking system 12 does not require the navigation feature to be used; rather, the lane tracking system 12 will use whatever data is available, including point-to-point navigation data, in selecting an anchor lane for tracking. This will be discussed in detail below.

The vehicle dynamics system 16 receives signals from a vehicle dynamics sensor suite 18, which may include longitudinal and lateral acceleration sensors, a yaw rate sensor, a vehicle velocity or wheel speed sensor, a steering wheel angle sensor, and others. The vision system 20 includes a front camera 22, which can detect many different types of objects in front of the vehicle 10. The front camera 22 may detect both left and right lane boundary markers, leading vehicles, and stationary objects, among other things. The vision system 20 may also include a rear camera 28, which is capable of detecting lane boundary markers behind the vehicle 10 on both the left and right sides. The rear camera 28 may also detect trailing vehicles.

The vehicle 10 may further include an object detection sensor 30, which could be an ultrasonic, infrared, radar or lidar sensor. The object detection sensor 30 could be used to detect stationary objects, such as trees and guard rails, or moving objects such as leading vehicles. The object detection sensor 30 could be part of the vision system 20 and used in conjunction with the cameras 22 and 28, or the object detection sensor 30 could operate independently and communicate directly with the lane tracking system 12.

As would be understood by one skilled in the art, the vision system 20 includes a processor, a memory module, and software specifically designed for image processing, object detection and recognition, and trajectory tracking. For example, the vision system 20 is capable of detecting either solid or dashed lane boundary markers in images from the cameras 22 and 28, and from these images determining the position, orientation and curvature of the lane boundary on the left and/or right side of the vehicle 10. The vision system 20 is also capable of using image data to track the trajectory of one or more leading vehicles.

The lane tracking system 12 is comprised of at least a processor and a memory module, where the processor is configured with software designed to select an anchor lane for tracking, which may be used by a semi-autonomous driving system for lateral control of the vehicle 10. The lane tracking system 12 receives data from the navigation & digital map system 14, the vehicle dynamics system 16, the vision system 20 and the object detection sensor 30, and finds the anchor lane that is consistent with lane boundary markers, navigation route, leading vehicle trajectory, and other data. The fusion of multiple data sources can be particularly beneficial when non-parallel lane boundary markers are encountered. The logic and calculations used in the lane tracking system 12 will be discussed in detail below.

FIG. 2 is an illustration of the vehicle 10 making an unwanted lateral maneuver when presented with a lane tracking dilemma at an exit lane split, as may happen without the lane tracking system 12. The vehicle 10 is driving on the roadway 40, which is splitting into a through lane 42 and an exit lane 44. The roadway 40 has a left lane boundary 50 and a right lane boundary 52, which initially are parallel and are a standard lane width apart, but diverge at increasing distances ahead of the vehicle 10. Assuming that the vehicle 10 wants to continue on the through lane 42, there is a desired path 54 which the vehicle 10 would ideally follow, where the desired path 54 transcribes the centerline of the through lane 42.

A typical lane tracking system will attempt to maintain the lateral position of the vehicle 10 mid-way between the left lane boundary 50 and the right lane boundary 52. However, this approach is clearly not viable as the vehicle 10 gets nearer the physical split of the through lane 42 and the exit lane 44. Eventually, the typical lane tracking system will have to select one lane or the other. Even if the typical lane tracking system selects the desired through lane 42, which is not guaranteed, the late lane selection will cause a sudden, unwanted lateral maneuver of the vehicle 10 as it follows an actual path 56.

FIG. 3 is an illustration of the vehicle 10 making a proper anchor lane selection when presented with a lane tracking dilemma at an exit lane split and using the lane tracking system 12. In FIG. 3, the vehicle 10 is driving on the same roadway 40 as shown in FIG. 2, and wants to continue on the through lane 42 along the desired path 54 (not shown in FIG. 3, for clarity). The lane tracking system 12 is able to use additional data, besides the positions of the left lane boundary 50 and the right lane boundary 52, to select an anchor lane for tracking. In particular, the lane tracking system 12 can use GPS data and a digital map to determine that the exit lane 44 is being approached. Furthermore, the lane tracking system 12 can use navigation data to determine that the vehicle 10 desires to follow the through lane 42. In addition, the lane tracking system 12 can track a leading vehicle 60 following a leading vehicle trajectory 62. Using all of the data available to it, the lane tracking system 12 can determine that it should use the left lane boundary 50 as an anchor for lane tracking, and disregard the right lane boundary 52 until such time as a new right lane boundary appears after the split of the exit lane 44. The decision logic and details of the calculations used in the lane tracking system 12 will be described below.

FIG. 4 is a flowchart diagram 80 of a method for anchor lane selection using multiple sources of data, as performed by the lane tracking system 12 in the scenario shown in FIG. 3 described above. The method of the flowchart diagram 80 is intended to operate continuously, being configured as software which runs on a microprocessor in the lane tracking system 12. The method begins at start box 82 where data is provided from vehicle sensors and systems, including the navigation & digital map system 14, the vehicle dynamics system 16 with the vehicle dynamics sensor suite 18, the vision system 20 with the cameras 22 and 28 and the object detection sensor 30.

At box 84, emergent behaviors of leading vehicles are detected. In other words, one or more leading vehicle trajectories may be established or maintained, based on data from the vision system 20. More than one leading vehicle trajectory is possible in situations such as driving on a curved road, where the vehicle 10 would have visibility to vehicles beyond the vehicle immediately preceding it in its lane. At box 86, lane information is predicted using information from the navigation & digital map system 14, if that information is of high confidence. A confidence value on map and navigation information can be assigned based on factors such as the level of agreement between position and velocity data and the current roadway type and direction (for example—does vehicle velocity match road type?), and the availability of point-to-point navigation data for determining which route to take at decision points. The lane information predicted at the box 86 includes lane position (centerline, and left and right lane boundaries) and lane curvature information for some distance ahead of the vehicle 10.

At box 88, if one or more leading vehicle trajectory is available from the box 84, then lane information is predicted based on leading vehicle trajectory information. Details of these calculations are discussed later. The remainder of the flowchart diagram 80 is arranged from left to right in order of increasing data availability from the vision system 20. By way of overview, no visual lane boundary information is available at the far left of the flowchart diagram 80, both left and right front visual lane boundary information is available at the far right of the diagram 80, and some visual lane data (left, right, or rear) is available in the center of the diagram 80.

At decision diamond 90, it is determined whether lane boundary information in front of the vehicle 10 is available from the vision system 20 (from the camera 22). The availability of front visual lane boundary information means that a lane boundary (curb or lane stripe) has been detected visually, such that the position and curvature of the lane boundary can be reliably estimated for some distance ahead of the vehicle 10. If no front visual lane boundary information is available, then at decision diamond 92 it is determined whether lane boundary information behind the vehicle 10 is available from the vision system 20 (from the rear camera 28). If no rear visual lane boundary information is available at the decision diamond 92, then at box 94 lane information is predicted using the map data from the box 86 and/or the leading vehicle trajectory data from the box 88, as available. From the box 94, the process ends at terminus 96, without using any visual lane boundary data.

If, at the decision diamond 92, rear visual lane boundary information is available, then this information is used at box 98. Rear visual lane boundary information is normally only used for position (offset of left or right lane boundary from the centerline of the vehicle 10), not for curvature prediction, due to the limitations of typical rear cameras. Thus, at the box 98, if left or right lane offset data from the vision system 20 deviates from offset data from map data or leading vehicle trajectories, then the offsets are updated using the rear vision system information. At box 100, a lane fusion calculation is performed using the data from the box 98, which is rear visual lane information. The lane fusion calculation at the box 100 uses a Kalman filter to fuse the lane information from the vision system 20 with vehicle motion data from the vehicle dynamics system 16, providing lane offset and heading error information as a result. Lane information from the vision system 20 may be supplemented with map-based lane information and/or leading vehicle-based lane information, as discussed above and below. The Kalman filter-based lane fusion calculations are described in co-pending U.S. patent application Ser. No. 13/289,517, titled LANE TRACKING SYSTEM, filed Nov. 4, 2011, which is assigned to the assignee of the present application, and which is hereby incorporated by reference.

If, at the decision diamond 90, front visual lane boundary information is available, then at decision diamond 102 it is determined whether the front visual lane boundary information is available for the left side, the right side, or both. If the front visual lane boundary information is only available for the left side, then at box 104 a left side lane boundary curvature calculation is performed. The calculation at the box 104 is a fusion of the left side visual lane information, the map data and the leading vehicle trajectory data. Details of this calculation will be explained below. If the front visual lane boundary information is only available for the right side, then at box 106 a right side lane boundary curvature calculation is performed. Following the left side lane curvature calculation at the box 104, it is determined at decision diamond 108 whether an exit lane is immediately ahead of the vehicle 10. This determination is based on the digital map data. Similarly, following the right side lane curvature calculation at the box 106, it is determined at decision diamond 110 whether an exit lane is immediately ahead of the vehicle 10.

If an exit lane is detected at either the decision diamond 108 or the decision diamond 110, then at box 112 it is determined whether the lane curvature from the vision system 20 (left or right side, as appropriate) is within a predetermined tolerance of the lane curvature from the digital map data and the leading vehicle trajectory data. If the visual data, the map data and the leading vehicle data all agree, then at the box 112 the fused curvature calculation from the box 104 or 106 is used as the anchor lane for tracking. If the visual curvature data does not agree with the map data and the leading vehicle trajectory data, then at the box 112 the visual curvature data is discarded and the lane curvature from the navigation & digital map system 14 is used, along with leading vehicle trajectory data if available. Discarding the vision system data and using the navigation and map data may be an indication that the vision system data is following an exit lane stripe while the vehicle 10 is supposed to be continuing on a through lane, or vice versa.

If no exit lane is detected at the decision diamond 108, then at box 114 the fused lane curvature information from the box 104 is used as the anchor lane for tracking. Similarly, if no exit lane is detected at the decision diamond 110, then at box 116 the fused lane curvature information from the box 106 is used as the anchor lane for tracking. From any of the boxes 112, 114 or 116, lane curvature data has been determined for the lane tracking system 12, and the process continues to the lane fusion calculation at the box 100, discussed previously. From the box 100, with lane offsets and heading calculations completed, the process ends at the terminus 96.

If, at the decision diamond 102, the front visual lane boundary information is available for both sides, then at box 118 lane curvature fusion calculations are performed for both sides separately. The lane curvature fusion calculations at the box 118 are the same as those performed at the boxes 104 and 106 for the left and right sides, respectively. As mentioned previously and discussed in detail below, the lane curvature fusion calculations combine vision system curvature data, map-based curvature data and leading vehicle trajectory curvature data. At box 120, additional steps are performed in order to select an anchor lane for tracking, as many different options are possible in the case where both left and right vision data are available. The steps performed at the box 120 are shown in the flowchart diagram 140.

FIG. 5 is a flowchart diagram 140 of a method for anchor lane selection using multiple sources of data, when both left and right lane boundary marker data is available. The method begins at start box 142 when the box 120 is encountered in the flowchart diagram 80. Left and right lane curvature fusion calculations from the box 118 are provided. At decision diamond 144, it is determined whether the left and right lane boundaries are parallel based on the curvature fusion calculations. If the left and right lane boundaries are not parallel, then at decision diamond 146 it is determined whether the lane boundaries are diverging (exit lane split) or converging (entrance lane merge). If a split is detected, at decision diamond 148 it is determined whether an exit lane is immediately ahead according to the map data. If no exit lane is imminent according to the map data, then at box 150 a curvature consistency check is performed in order to select the anchor lane for tracking. The curvature consistency check calculation at the box 150 will be discussed in detail below. With the anchor lane selected, the process ends at terminus 152 and returns to the box 100 of the flowchart diagram 80, where the Kalman filter lane fusion calculation is performed.

If, at the decision diamond 148, an exit lane is imminent according to the map data, then at box 154 the left or right lane boundary is selected as the anchor for tracking based on consistency with map & navigation data. That is, the lane boundary is selected which has curvature consistent with the curvature of the through lane from the digital map data, unless navigation data indicates the exit lane is to be taken. If no consistency is found for left or right lane boundary, the anchor is selected based on the side of the exit lane. For example, the left side is selected as the anchor if the exit lane is on the right side, and vice versa.

If a merge is detected at the decision diamond 146, then at decision diamond 156 it is determined whether an entrance lane is adjacent to the vehicle 10 according to the map data. If no entrance lane is adjacent according to the map data, then at box 158 a curvature consistency check is performed in order to select the anchor lane for tracking. If, at the decision diamond 156, an entrance lane is adjacent according to the map data, then at the box 154 the left or right lane boundary is selected as the anchor for tracking based on consistency with map & navigation data. That is, the lane boundary is selected which has curvature consistent with the curvature of the through lane from the digital map data. After any of the boxes 150, 154 or 158, with the anchor lane selected, the process ends at the terminus 152 and returns to the box 100 of the flowchart diagram 80, where the Kalman filter lane fusion calculation is performed.

Returning to the decision diamond 144, if the left and right lane boundaries are parallel, then at decision diamond 160 it is determined whether there is a sudden jump in lane boundary offsets from vision system data. Details of the sudden jump calculation will be discussed below. If there is no sudden jump in offsets, then at box 162 the left and right lane boundary curvatures are combined and used as the anchor lane for tracking. Because the left and right boundaries are parallel and no sudden jumps are present at the box 162, the left and right boundary shapes and curvatures should be very similar, and a simple combination technique such as averaging can be used. Following the anchor lane combination at the box 162, the process ends at the terminus 152 as discussed previously.

If a sudden jump in offsets is detected at the decision diamond 160, then at decision diamond 164 it is determined whether the sudden jump occurs on the left side lane boundary, or the right side, or both. If the sudden jump is on the left side lane boundary, then at box 166 the right side lane boundary is selected as the anchor lane for tracking. If the sudden jump is on the right side lane boundary, then at box 168 the left side lane boundary is selected as the anchor lane for tracking.

If the sudden jump occurs in both the left and right side lane boundaries, then at box 170 an anchor lane boundary is selected as a balance between lane geometric shape change and riding comfort. For example, if the left lane boundary suddenly jumps to the left and the right lane boundary suddenly jumps to the right, then an averaging of the two may result in an appropriate tracking target. However, if both lane boundaries suddenly jump in the same direction, it may be necessary to temporarily discard the visual data and select the anchor lane based on map data, with leading vehicle trajectory data if available. Following the anchor lane selection at any of the boxes 166, 168 or 170, the process ends at the terminus 152 as discussed previously.

In the flowchart diagrams of FIGS. 4 and 5, calculations were briefly introduced which require further detailed discussion. These calculations include the lane curvature fusion calculation performed at the boxes 104, 106 and 118, the curvature consistency calculation performed at the boxes 150 and 158, and the offset sudden jump calculation performed at the decision diamond 160.

The lane curvature fusion calculation determines a fused lane curvature based on either left or right visual lane boundary curvature along with map-based curvature data and leading vehicle-based curvature data. Using the left side as an example, a fused curvature $\kappa'_L$ can be defined as:

$$\kappa'_L = \kappa_{Vis\_L} W_1 + \kappa_{Map} W_2 + \kappa_{Lead\_veh} W_3 \quad (1)$$

Where $\kappa_{Vis\_L}$ is the lane curvature from the left side visual measurement, $\kappa_{Map}$ is the lane curvature from digital map data, and $\kappa_{Lead\_veh}$ is the lane curvature from the leading vehicle trajectory data. Methods for determining $\kappa_{Vis\_L}$, $\kappa_{Map}$ and $\kappa_{Lead\_veh}$ are defined below. In equation (1), the weighting factors are defined as:

$$W_1 = \frac{C_1 \sigma^2_{Vis\_L}}{W_{Total}}$$

$$W_2 = \frac{C_2 \sigma^2_{Map}}{W_{Total}}$$

$$W_3 = \frac{C_3 \sigma^2_{Lead\_veh}}{W_{Total}}$$

and $$W_{Total} = C_1 \sigma^2_{Vis\_L} + C_2 \sigma^2_{Map} + C_3 \sigma^2_{Lead\_veh}$$

In the weighting factor definitions above, $C_1$ is the confidence of the vision sensing information, $C_2$ is the confidence of the digital map information including its GPS data, and $C_3$ is the confidence of the lead vehicle sensing information. The confidence factors $C_1$, $C_2$ and $C_3$ each have a value between 0 and 1, and can be adjusted based on parameters such as the clarity of the lane stripe detected by the vision system 20, for example. Furthermore, the parameters $\sigma^2_{Vis\_L}$, $\sigma^2_{Map}$ and $\sigma^2_{Lead\_veh}$ are the variances of the individual measurements from the respective systems, which may be estimated using traditional statistical methods.

The lane curvature from the left side visual measurement can be defined as:

$$\kappa_{Vis\_L} = \text{median}\{k1,k2,k3,k4,k5,k6,k7\} \quad (2)$$

Where the values $\{k1, \ldots, k7\}$ are the seven most recent curvature measurements from the vision system 20 on the left side of the vehicle 10. More or fewer than seven measurements could be used. Typically, the seven most recent vision system measurements would have been sampled over about the last 1 second. A median value of recent measurements is used to filter out high frequency noise in the measurements, as direct vision system measurements are noisy due to complicated road situations, while the true road curvature on a highway changes slowly.

The lane curvature from the navigation & digital map system 14, $\kappa_{Map}$, can be defined as the parameter b in the following linear regression model:

$$t = a + b*s \quad (3)$$

Where t is the tangent angle of the path at a waypoint (x,y) and s is the approximated curve length from the vehicle 10 to the waypoint (x,y). GPS data can be used by the navigation & digital map system 14 to determine the current vehicle location. A series of road waypoints can then be defined in front of the vehicle 10. The waypoints have the format $\{(x1, y1, t1), (x2, y2, t2), \ldots (xn, yn, tn)\}$, where (x, y) is the location of the waypoint ahead of the vehicle 10 and t is the tangent angle at the waypoint.

Sample points $(s_1, t_1), \ldots (s_n, t_n)$ can be derived from the waypoints with $s_1=0$, and $s_i = \Sigma_{k=2}^{i} \sqrt{(x_k-x_{k-1})^2+(y_k-y_{k-1})^2}$ for $i \geq 2$. A least square procedure can be applied to estimate the coefficient b (which is the curvature $\kappa_{Map}$) as follows:

$$\kappa_{Map} = b = \underset{b}{\arg\min} \sum_{i=1}^{n} \|a + bs_i - t_i\|^2 \quad (4)$$

The lane curvature from leading vehicle trajectories, $\kappa_{Lead\_veh}$, can be determined from in-vehicle forward-looking radar. Under certain circumstances, it can be assumed that the vehicle 10 is intended to follow in the same lane as the leading vehicle 60. Furthermore, more than one leading vehicle trajectory may exist, as explained previously.

It can be assumed that a list of trajectories exists, $\lambda_i$, $i=1, \ldots, N$ with each trajectory consisting of a series of points, i.e., $\lambda_i = (p_t^i, p_{t-1}^i, \ldots, p_{t-v_i+1}^i)$ and $v_i$ is the length of (number of points in) the trajectory. When a new list of tracks $\{q_k | k=1, \ldots, M\}$, or target points relative to the vehicle 10, arrive at time step t+1, it is first necessary to project each point of $\lambda_i$ based on motion of the vehicle 10—specifically, the vehicle speed ($v_H$) and the yaw rate ($\omega_H$). Let the point $p_t^i = (x_t^i, y_t^i)$. The projected point $p'_t{}^i = (x'_t{}^i, y'_t{}^i)$ is defined as:

$$x'_t{}^i = \cos \omega_H \Delta t (x_t^i - v_H \Delta t) + \sin \omega_H \Delta t y_t^i$$

$$y'_t{}^i = \sin \omega_H \Delta t (x_t^i - v_H \Delta t) + \cos \omega_H \Delta t y_t^i$$

Next, it is necessary to associate the track $q_k$ to the trajectory $\lambda_j$ such that j is determined from $\min_{i=1, \ldots, N} \|q_k - p_t^i\|$ and the distance to the first point $p_t^j$ of the trajectory is less than a predefined threshold T. That is, each new radar track is associated to the existing trajectory to which it best fits. Then the point of the new track $q_k$ is added to the associated trajectory $\lambda_j$, such that $p_{t+1}^j = q_k$ and the updated trajectory $\lambda'_j = \{p_{t+1}^j, p_t^j, \ldots, p_{t-v_j+1}^j\}$.

For each $q_k$ that $\min_{i=1, \ldots, N} \|q_k - p_t^i\|$ is larger than the distance threshold T, a new trajectory is created with $q_k$ being the first point. Existing trajectories are deleted if they do not match any new track $q_k$, for $k=1, \ldots, M$.

Finally, curve fitting is performed for each trajectory $\lambda_i$ whose length is larger than a threshold; that is, $v_i > K$, for $i=1, \ldots, N$. Let the trajectory $\lambda_i$ consist of a list of points, $(x_1, y_1), \ldots, (x_v, y_v)$. Short trajectories (which still exceed the threshold K) can be fit with a linear model. Medium-length trajectories can be fit with a quadratic model. Long trajectories can be fit with a cubic model. The linear, quadratic and cubic models for fitting the trajectories are described below.

If a linear model is assumed for the curve, of the form $y = ax + b$, the nominal values for the coefficients can be defined as $\tilde{a}$ and $\tilde{b}$. The objective is to minimize the function:

$$\min_{a,b} \Sigma_{k=1}^v \|ax_k + b - y_k\|^2 + \alpha_a \|a - \tilde{a}\|^2 + \alpha_b \|b - \tilde{b}\|^2 \quad (5)$$

Where the positive factors $\alpha_a$ and $\alpha_b$ determine how much trust is given to the nominal values $\tilde{a}$ and $\tilde{b}$, respectively. The solution of the above least-squares is:

$$\begin{bmatrix} \bar{a} \\ \bar{b} \end{bmatrix} = A^{-1} \beta$$

Where;

$$A = \begin{bmatrix} \sum_{k=1}^v x_k^2 + \alpha_a & \sum_{k=1}^v x_k \\ \sum_{k=1}^v x_k & v + \alpha_b \end{bmatrix}$$

And;

$$\beta = \begin{bmatrix} \sum_{k=1}^v x_k y_k + \alpha_a \\ \sum_{k=1}^v y_k + \alpha_b \end{bmatrix}$$

If a quadratic model is assumed for the curve, of the form $y = ax^2 + bx + c$, the nominal values for the coefficients can be defined as $\tilde{a}$, $\tilde{b}$, and $\tilde{c}$. The objective is to minimize the function:

$$\min_{a,b,c} \Sigma_{k=1}^v \|ax_k^2 + bx_k + c - y_k\|^2 + \alpha_a \|a - \tilde{a}\|^2 + \alpha_b \|b - \tilde{b}\|^2 + \alpha_c \|c - \tilde{c}\|^2 \quad (6)$$

Where the positive factors $\alpha_a$, $\alpha_b$, and $\alpha_c$ determine how much trust is given to the nominal values $\tilde{a}$, $\tilde{b}$, and $\tilde{c}$, respectively. The solution of the above least-squares is:

$$\begin{bmatrix} \bar{a} \\ \bar{b} \\ \bar{c} \end{bmatrix} = A^{-1} \beta$$

Where;

$$A = \begin{bmatrix} \sum_{k=1}^v x_k^4 + \alpha_a & \sum_{k=1}^v x_k^3 & \sum_{k=1}^v x_k^2 \\ \sum_{k=1}^v x_k^3 & \sum_{k=1}^v x_k^2 + \alpha_b & \sum_{k=1}^v x_k \\ \sum_{k=1}^v x_k^2 & \sum_{k=1}^v x_k & v + \alpha_c \end{bmatrix}$$

And;

$$\beta = \begin{bmatrix} \sum_{k=1}^v x_k^2 y_k + \alpha_a \\ \sum_{k=1}^v x_k y_k + \alpha_b \\ \sum_{k=1}^v y_k + \alpha_c \end{bmatrix}$$

If a cubic model is assumed for the curve, of the form $y = ax^3 + bx^2 + cx + d$, the nominal values for the coefficients can be defined as $\tilde{a}$, $\tilde{b}$, $\tilde{c}$, and $\tilde{d}$. The objective is to minimize the function:

$$\min_{a,b,c} \Sigma_{k=1}^v \|ax_k^3 + bx_k^2 + cx_k + d - y_k\|^2 + \alpha_a \|a - \tilde{a}\|^2 + \alpha_b \|b - \tilde{b}\|^2 + \alpha_c \|c - \tilde{c}\|^2 + \alpha_d \|d - \tilde{d}\|^2 \quad (7)$$

Where the positive factors $\alpha_a$, $\alpha_b$, $\alpha_c$, and $\alpha_d$ determine how much trust is given to the nominal values $\tilde{a}$, $\tilde{b}$, $\tilde{c}$, and $\tilde{d}$, respectively. The solution of the above least-squares is:

$$\begin{bmatrix} \bar{a} \\ \bar{b} \\ \bar{c} \\ \bar{d} \end{bmatrix} = A^{-1} \beta$$

Where;

$$A = \begin{bmatrix} \sum_{k=1}^v x_k^6 + \alpha_a & \sum_{k=1}^v x_k^5 & \sum_{k=1}^v x_k^4 & \sum_{k=1}^v x_k^3 \\ \sum_{k=1}^v x_k^5 & \sum_{k=1}^v x_k^4 + \alpha_b & \sum_{k=1}^v x_k^3 & \sum_{k=1}^v x_k^2 \\ \sum_{k=1}^v x_k^4 & \sum_{k=1}^v x_k^3 & \sum_{k=1}^v x_k^2 + \alpha_c & \sum_{k=1}^v x_k \\ \sum_{k=1}^v x_k^3 & \sum_{k=1}^v x_k^2 & \sum_{k=1}^v x_k & v + \alpha_d \end{bmatrix}$$

-continued

And;

$$\beta = \begin{bmatrix} \sum_{k=1}^{v} x_k^3 y_k + \alpha_a \\ \sum_{k=1}^{v} x_k^2 y_k + \alpha_b \\ \sum_{k=1}^{v} x_k y_k + \alpha_c \\ \sum_{k=1}^{v} y_k + \alpha_d \end{bmatrix}$$

Whether a linear, quadratic or cubic model is fit to the leading vehicle trajectory, the curvature $\kappa_{Lead\_veh}$ can be readily determined from the polynomial approximation of the trajectory.

Using the methods described above for determining the three curvature values—$\kappa_{Vis\_L}$, $\kappa_{Map}$ and $\kappa_{Lead\_veh}$—and the associated variations, confidence values and weighting factors, equation (1) can be used to calculate a fused lane curvature value, $\kappa'_L$, based on left-side visual lane boundary curvature data, map-based curvature data and leading vehicle-based curvature data. This completes the lane curvature fusion calculation performed at the box 104, with similar calculations performed at the box 106 (right side) and the box 118 (both sides separately).

The curvature consistency check calculation at the boxes 150 and 158 of the flowchart diagram 140 is used when both left and right lane boundaries are visually detected, they are not parallel, and no exit or entrance lane is detected from digital map data. In such a situation, it is possible to select the anchor lane based on consistency of the visual data with all other lane curvature data, while also including heading angle changes in the calculation.

For each of the left and right sides, a curvature consistency value C can be defined as:

$$C_L = \theta_L^2 + \Delta\kappa_L^2 + \theta_L \Delta\kappa_L \quad (8)$$

$$C_R = \theta_R^2 + \Delta\kappa_R^2 + \theta_R \Delta\kappa_R \quad (9)$$

Where $\theta_L$ and $\theta_R$ are the heading angles of the left and right lane boundaries from visual data, respectively, with respect to the current vehicle heading. $\Delta\kappa_L$ and $\Delta\kappa_R$ are the left and right curvature errors, respectively, which are calculated as follows:

$$\Delta\kappa_L = \min(|\kappa_{Vis\_L} - \kappa'_L|, MAX\_\Delta) \quad (10)$$

$$\Delta\kappa_R = \min(|\kappa_{Vis\_R} - \kappa'_R|, MAX\_\Delta) \quad (11)$$

Where $\kappa_{Vis\_L}$ and $\kappa_{Vis\_R}$ are the left and right curvature values from visual measurement, respectively, as defined previously in equation (2), and $\kappa'_L$ and $\kappa'_R$ are the left and right fused lane curvature values, respectively, as defined previously in equation (1). Thus, the curvature errors $\Delta\kappa$ represent the difference between visually-measured lane curvature and lane curvature fused from multiple sources.

When a curvature consistency calculation is required at the box 150 or 158, equations (8) and (9) are evaluated and the smaller of the two values identifies the anchor lane. That is, if $C_L$ is smaller than $C_R$, then the left lane boundary is chosen as the anchor lane for tracking, and vice versa.

The sudden jump calculation at the decision diamond 160 is used to check the temporal consistency of the lane boundary offset from visual data. If the variance of one side's offset (lateral distance from centerline of vehicle to lane boundary) is larger than a threshold, that side's measurement is rejected, and the other side is chosen as the anchor lane for tracking. The evaluation can be performed by rejecting one side's visual measurement if the following function evaluates as true:

$$IF(|y_{new} - \bar{y}| > 3*\sigma_y) \quad (12)$$

Where $y_{new}$ is the new observation of lane marker offset from the vision system 20, $\bar{y}$ is the predicted lane marker offset based on previous measurements, and $\sigma_y$ is the standard deviation of the lane marker offset from the previous measurements.

Thus, a sudden jump (increase or decrease) in the value of one side's offset, by an amount greater than three times the standard deviation of the offsets, could be an indication that a false lane boundary has been detected by the vision system 20, and that the other side's lane boundary should be used as the anchor lane for tracking.

Using the methods disclosed herein, multiple data sources can be incorporated into a lane tracking decision. Using all available data sources—such as map/navigation data and leading vehicle trajectories along with vision system data—improves the quality of the lane tracking decisions, especially at entrance and exit lane locations, thus increasing customer satisfaction with lane tracking and semi-autonomous driving features.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for selecting an anchor lane in a vehicle lane tracking system, said method comprising:
   predicting lane information for a vehicle using digital map data, including determining whether an exit or entrance lane is present;
   using a controller to predict lane information for the vehicle using leading vehicle trajectory data;
   obtaining from a vision system at least one of left lane marker data and/or right lane marker data;
   performing a lane curvature fusion calculation using the digital map data, the leading vehicle trajectory data and the lane marker data from the vision system, where the lane curvature fusion calculation is performed on a microprocessor in the vehicle lane tracking system;
   comparing the lane marker data from the vision system to the digital map data and the leading vehicle trajectory data; and
   selecting an anchor lane for tracking based on whether the exit or entrance lane is present and the comparison of the lane marker data from the vision system to the digital map data and the leading vehicle trajectory data.

2. The method of claim 1 wherein the lane information includes lane heading angle and lane curvature.

3. The method of claim 1 wherein the digital map data includes navigational route data for the vehicle.

4. The method of claim 1 wherein the lane curvature fusion calculation is a weighted average of lane curvature from the vision system data, lane curvature from the digital map data and lane curvature from the leading vehicle trajectory data.

5. The method of claim 4 wherein the lane curvature from the vision system data is chosen as a median value of recent measurements.

6. The method of claim 4 wherein the lane curvature from the digital map data is calculated using a least-squares curve fit to road waypoint data from a navigation & digital map system.

7. The method of claim 4 wherein the lane curvature from the leading vehicle trajectory data is calculated by transposing object tracks from an object detection sensor into trajectory paths and fitting a curve to each of the trajectory paths.

8. The method of claim 1 wherein comparing the lane marker data from the vision system to the digital map data and the leading vehicle trajectory data includes discarding the lane marker data from the vision system on a side of the vehicle where the exit or entrance lane is present.

9. The method of claim 1 wherein selecting an anchor lane for tracking includes determining whether left and right lane boundaries are parallel, performing a curvature consistency calculation if the left and right lane boundaries are not parallel but no exit or entrance lane is present, and using a lower curvature consistency value to identify the anchor lane for tracking.

10. The method of claim 1 wherein selecting an anchor lane for tracking includes discarding the lane marker data from the vision system on a side of the vehicle where a sudden jump in offsets is detected.

11. The method of claim 1 further comprising performing a lane fusion calculation using the lane curvature fusion and vehicle dynamics data as input to a Kalman filter computation, where the lane fusion calculation determines lane offset and heading error.

12. A method for selecting an anchor lane in a vehicle lane tracking system, said method comprising:
   predicting lane information for a vehicle using digital map data including navigational route data for the vehicle;
   using a controller to predict lane information for the vehicle using leading vehicle trajectory data;
   obtaining from a vision system at least one of left lane marker data and/or right lane marker data;
   performing a lane curvature fusion calculation using the digital map data, the leading vehicle trajectory data and the lane marker data from the vision system, where the lane curvature fusion calculation is performed on a microprocessor in the vehicle lane tracking system;
   comparing the lane marker data from the vision system to the digital map data and the leading vehicle trajectory data, including discarding the lane marker data from the vision system on a side of the vehicle where an exit or entrance lane is present; and
   selecting an anchor lane for tracking based on the comparison of the lane marker data from the vision system to the digital map data and the leading vehicle trajectory data, including determining whether left and right lane boundaries are parallel, performing a curvature consistency calculation if the left and right lane boundaries are not parallel but no exit or entrance lane is present, and using a lower curvature consistency value to identify the anchor lane for tracking.

13. The method of claim 12 wherein the lane curvature fusion calculation is a weighted average of lane curvature from the vision system data, lane curvature from the digital map data and lane curvature from the leading vehicle trajectory data, and where the lane curvature from the vision system data is chosen as a median value of recent measurements, the lane curvature from the digital map data is calculated using a least-squares curve fit to road waypoint data from a navigation & digital map system, and the lane curvature from the leading vehicle trajectory data is calculated by transposing object tracks from an object detection sensor into trajectory paths and fitting a curve to each of the trajectory paths.

14. The method of claim 12 wherein selecting an anchor lane for tracking includes discarding the lane marker data from the vision system on a side of the vehicle where a sudden jump in offsets is detected.

15. A lane tracking system for a vehicle comprising:
   input channels for receiving data from a navigation & digital map system, a vision system, an object detection sensor and a vehicle dynamics system;
   a memory module for storing the received data and any calculated data; and
   a processor configured to perform a lane curvature fusion calculation using lane data from the navigation & digital map system, leading vehicle trajectory data from the object detection sensor and lane marker data from the vision system, said processor being further configured to select an anchor lane for tracking based on whether an exit or entrance lane is present and a comparison of the lane marker data from the vision system to the lane data from the navigation & digital map system and the leading vehicle trajectory data from the object detection sensor.

16. The system of claim 15 wherein the lane curvature fusion calculation is a weighted average of lane curvature from the vision system lane marker data, lane curvature from the navigation & digital map lane data and lane curvature from the leading vehicle trajectory data.

17. The system of claim 15 wherein the comparison of the lane marker data from the vision system to the lane data from the navigation & digital map system and the leading vehicle trajectory data from the object detection sensor includes discarding the lane marker data from the vision system on a side of the vehicle where the exit or entrance lane is present.

18. The system of claim 15 wherein selecting an anchor lane for tracking includes determining whether left and right lane boundaries are parallel, performing a curvature consistency calculation if the left and right lane boundaries are not parallel but no exit or entrance lane is present, and using a lower curvature consistency value to identify the anchor lane for tracking.

19. The system of claim 15 wherein selecting an anchor lane for tracking includes discarding the lane marker data from the vision system on a side of the vehicle where a sudden jump in offsets is detected.

20. The system of claim 15 wherein the processor is also configured to perform a lane fusion calculation using the lane curvature fusion and vehicle dynamics data as input to a Kalman filter computation, where the lane fusion calculation determines lane offset and heading error.

* * * * *